US007006684B2

(12) United States Patent
Thornber et al.

(10) Patent No.: US 7,006,684 B2
(45) Date of Patent: Feb. 28, 2006

(54) CAST SHADOWS AND LINEAR SUBSPACES FOR OBJECT RECOGNITION

(75) Inventors: Karvel K. Thornber, Berkeley Heights, NJ (US); David W. Jacobs, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 654 days.

(21) Appl. No.: 10/085,750

(22) Filed: Feb. 28, 2002

(65) Prior Publication Data

US 2003/0113011 A1 Jun. 19, 2003

Related U.S. Application Data

(63) Continuation-in-part of application No. 09/967,206, filed on Sep. 28, 2001.

(51) Int. Cl.
*G06K 9/00* (2006.01)
(52) U.S. Cl. .................... 382/154; 382/118; 382/190; 345/426
(58) Field of Classification Search ............... 382/118, 382/154, 190; 345/426
See application file for complete search history.

(56) References Cited

U.S. PATENT DOCUMENTS 6,137,896 A * 10/2000 Chang et al. ............... 382/118
6,639,594 B1 * 10/2003 Zhang et al. ............... 345/426

OTHER PUBLICATIONS

Georghiades et al., Illumination Cones for Recognition Under Variable Lighting: Faces, 1998, Computer Vision and Pattern Recognition, pp. 52-58.*
Mukaigawa et al., Photometric image-based rendering for image generation in arbitrary illumination, Computer Vision, 2001 ICCV 2001. Proceedings. Eighth IEEE International Conference on, vol. 2, Jul. 7-14, 2001 pp. 652-659.*
Bolvin et al., Image-Based Rendering of Diffuse, Specular and Glossy Surfaces from a Single Image, ACM SIGGRAPH, Aug. 2001, pp. 107-116.*
1. M.E. Rose, "Elementary Theory of Angular Momentum", ISBN 0471 73524 8 pp. 228-235, 1957.
2. Hideki Hayakawa, Photometric Stereo Under a Light Source With Arbitrary Motion, *Journal of Optical Society of America*, vol. 11, No. 11, pp. 3079-3089, Nov. 1994.
3. Peter W. Hallinan, "A Low-Dimensional Representation of Human Faces For Arbitrary Lighting Conditions", *IEEE Conference on Computer Vision and Pattern Recognition*, pp. 995-998, (1994).
4. Jan J. Koenderink and Andrea J. Van Doorn, "The Generic Bilinear Calibration-Estimation Problem", *International Journal of Computer Vision* vol. 23, No. 3,pp. 217-234, (1997).
5. Amnon Shashua, "On Photometric Issues in 3D Visual Recognition from a Single 2D Image", *International Journal of Computer Vision*, vol. 21, No. 1-2, pp. 99-122, (1997).
6. Peter N. Belhumeur and David J. Kriegman, "What is the set of Images of an Object Under All Possible Illumination Conditions", *International Journal of Computer Vision*, vol. No. 28, No. 3, pp 245-260, (1998).
7. M.S. Langer, "When Shadows Become Interreflections", *International Journal of Computer Vision*, vol. 34, No. 2-3, pp. 193-204 (1999).
8. Ronen Basri and David Jacobs, "Lambertian Reflectance and Linear Subspaces", *IEEE Conference on Computer Vision,II*, pp. 383-390, 2001.
9. R. Ramamoorthi and P. Hanrahan, "On The Relationship Between Radiance and Irradiance: Determining The Illumination from Images of a Convex Lambertian Object", *Journal of Optical Society of America*, vol. 18, No. 10, pp. 2448-2458, 2001.
10. K.K. Thornber and D.W. Jacobs, "Broadened, Specular Reflection and Linear Subspaces", NEC Research Institute, Inc., Technical Report #2001-033.

* cited by examiner

*Primary Examiner*—Bhavesh M. Mehta
*Assistant Examiner*—John Strege
(74) *Attorney, Agent, or Firm*—Scully, Scott, Murphy & Presser

(57) ABSTRACT

The present invention is a method of deriving a reflectance function that analytically approximates the light reflected from an object model in terms of the spherical harmonic components of light. The reflectance function depends upon the intensity of light incident at each point on the model, but excludes light originating from below a local horizon, therefore not contributing to the reflectance because of the cast shadows. This reflectance function is used in the process of machine vision, by allowing a machine to optimize the reflectance function and arrive at an optimal rendered image of the object model, relative to an input image. Therefore, the recognition of an image produced under variable lighting conditions is more robust. The reflectance function of the present invention also has applicability in other fields, such as computer graphics.

15 Claims, No Drawings

CAST SHADOWS AND LINEAR SUBSPACES FOR OBJECT RECOGNITION

CROSS REFERENCE TO RELATED APPLICATIONS

This Application is a Continuation-in-Part of U.S. patent application Ser. No. 09/967,206, filed 28 Sep. 2001, entitled "Broadened-Specular Reflection and Linear Subspaces for Object Recognition", the disclosure of which is hereby incorporated by reference for all purposes.

BACKGROUND OF THE INVENTION

1. Field of Invention

The present invention relates generally to machine vision, and more particularly, to a method of modeling the shadows cast by various features of an object onto its own surface under certain lighting conditions, to allow a machine to recognize the image of that object when illuminated by a wide variety of lighting conditions.

2. Description of Related Art

It is clear that changes in lighting can have a large effect on how an object, such as a person, looks. Understanding this is essential to building effective object recognition systems.

U.S. patent application Ser. No. 09/705,507, filed 3 Nov. 2000, entitled "Lambertian Reflectance and Linear Subspaces", the disclosure of which is hereby incorporated by reference, considered the relationship between the function that describes the lighting intensity, and the reflectance function that describes how much light an object reflects as a function of its surface normal, under a given lighting condition. Representing these functions as spherical harmonics, it was shown that for Lambertian reflectance the mapping from lighting to reflectance is a convolution with a nearly perfect low-pass filter. High-frequency components of the lighting hardly affect the reflectance function. Therefore, nearly all Lambertian reflectance functions could be modeled as some linear combination of nine spherical harmonic components.

These low-dimensional approximations have two key advantages. First, they are described with few parameters, thus optimization is simpler. Moreover, the images produced under low-frequency lighting are inherently immune to small changes in orientation. A small rotation in the surface normal is equivalent to a small rotation in the light. However, low-frequency light does not appreciably change with a small rotation. The analysis shows this, in that an image produced by an $n^{th}$ order harmonic light component is computed by taking an $n^{th}$ degree polynomial of the components of the surface normal.

U.S. patent application Ser. No. 09/967,206, incorporated by reference above, expanded the spherical harmonic approach to consider both the effects of broadened specular reflection as well as Lambertian reflection. Thus, the reflectance function that describes how much light an object reflects as a function of its surface normal, under a given lighting condition was made more realistic.

That work has considered the effects of attached shadows, which arise locally, when some portion of the object is facing away from the light. However, it has not addressed the problems that arise when one part of an object casts a shadow on a different part of the object. This is important, because many objects of interest are characterized by features whose prominence produces cast shadows over a significant portion of the surrounding surface, especially at low angles of illumination (high angles of incidence relative to the surface normal). Indeed, no natural object is convex, and relatively few manufactured objects are, and even fewer when seen in combination. Thus, cast shadows can be expected to play an important role in reflection, and, therefore must be included in harmonic treatments.

BRIEF SUMMARY OF THE INVENTION

The goal of the present invention is to allow a machine, such as a computer, to match an input image of an object, such as a human face, to an object model stored in a database associated with the machine, and to perform this matching with a high degree of accuracy.

The steps of the recognition method of the present invention include providing a database of three-dimensional object models, providing an input image, positioning each three dimensional model relative to the input image, determining an optimal rendered image of the model that is most similar to the input image, computing a measure of similarity between the input image and the optimal rendered image of each model, and selecting the object whose optimal rendered image is most similar to the input image. The step of determining an optimal rendered image includes deriving a reflectance function for each object that includes the effects of cast shadows, and optimizing that reflectance function to most closely match the input image.

The method of the present invention includes rendering the images produced by an object model when illuminated only by each of a plurality of spherical harmonic components of light. The summation of these components defines the reflectance function for the object model. The derived reflectance function takes into account the intensity of light components incident on the object model, as well as the portion of incident light which does not reach a given point because that light originates below some local horizon, that point therefore being in a region of cast shadow. The horizon is defined in terms of the polar angle at a given point, and can be a function of the azimuthal direction of the incident light.

Among the advantages of this approach is the ease of application and computational efficiency over serial methods of dealing with cast shadows, such serial methods being of the type including ray tracing, for example.

DETAILED DESCRIPTION OF THE INVENTION

Deriving the Reflectance Function

To derive a reflection function that accounts for some obstruction between the surface point of interest and the light source, consider a small surface region of an object model with surface normal $\hat{n}$. Let $\mu=\cos\theta$, where $\theta$ is the polar angle of a ray of light striking the region relative to $\hat{n}$. Let $\phi$ be the azimuth of the ray, also relative to $\hat{n}$. Now if the object is convex, all rays with $0\leq\theta\leq\pi/2(\mu\geq0)$ and $0\leq\phi\leq2\pi$ will illuminate the surface. However, in general, only rays whose polar angles satisfy $\mu(\phi)\leq\mu\leq1$, $0\leq\theta\leq\theta(\phi)$ will contribute to the illumination, and hence to the reflection. Here $\theta(\phi)$ is just the angle (relative to the normal) that outlines the local horizon as one sweeps through the azimuth. In the usual treatments one takes $\theta(\phi)=\pi/2$, for if $\theta(\phi)\sim\pi/2$, so little light intensity per unit area is available that, unless the incoming light is low and highly directional, little error is made. However, for $\theta(\phi)$ much less than $\pi/2$, some compensation must be made for the resulting shadows.

Three models of cast shadows are considered in the context of the harmonic-decomposition approach. The most general model takes θ(φ) and determines the surface intensity for each $L_{lm}$ lighting component, where $L(\hat{n}_i)=\Sigma_{lm}L_{lm}Y_{lm}(\hat{n}_i)$ is the illumination on the object. This involves considerable calculation, but will be necessary in many realistic examples.

The simplest model, the crater model, is to assume that $\mu(\phi)=\mu_0$. In other words, that the region of interest sits in a depression with symmetry about the azimuth. While it is not clear, without more computation, what effective value to choose for $\mu_0$ given $\mu(\phi)$, for $\mu_0>0$ clearly the reduction in incident intensity and shift to higher harmonics can at least be simulated. These features are characteristic of shadows and are impossible to incorporate treating objects as convex. Sketching the derivation of the reflection in this model following the lines and notation of application Ser. No. 09/967,206, incorporated by reference above, one can then consider a somewhat more general model, and finally proceed to the most general case.

If $r_{CSCX}(\hat{n})$ is the reflection in the presence of cast-shadows in the crater approximation for a surface normal of $\hat{n}$, then $$r_{CSCX}(\hat{n})=u(\hat{z}\cdot\hat{n})\int d\hat{n}_i L(\hat{n}_i)(\hat{n}_i\cdot\hat{n})u(\hat{n}_i\cdot\hat{n}-\mu_0)$$

where $L(\hat{n}_i)$ is the incident light intensity in the $-\hat{n}_i$ direction and $\mu_0$ defines the effective local horizon of the crater. In the 09/967,206 Application $\mu_0$ was taken as zero. Also, u denotes the step function that is one for positive values and zero otherwise. Therefore, the step function including $\mu$ as shown in the above equation analytically excludes light originating from any point below the local horizon at the point of interest from contributing to the reflectance.

Focusing on the Lambertian factor one can find $$(\hat{n}_i\cdot\hat{n})u(\hat{n}_i\cdot\hat{n}-\mu_0)=\sum_{lm}(4\pi/(2l+1))^{1/2}k_{\mu l}Y_{lm}(\hat{n})Y_{lm}^*(\hat{n}_i)$$

where $Y_{lm}(\hat{n})$ is the lm spherical harmonic function of the direction $\hat{n}$, and where $$k_{\mu l}=\int_0^{2\pi}d\phi\int_{\mu_0}^1 d\mu\mu Y_{l0}(\theta,\phi)$$

Since $$Y_{l0}(\theta,\phi)=((2l+1)/4\pi)^{1/2}P_l(\mu)$$

$$k_{\mu l}=((2l+1)\pi)^{1/2}\int_{\mu_0}^1 d\mu\mu P_l(\mu)$$

$$P_l(\mu)=(2^l l!)^{-1}d^l(\mu^2-1)^l/d\mu^l$$

evaluating one can find $$k_{\mu 0}=\pi^{1/2}(1-\mu_0^2)/2$$

$$k_{\mu 1}=\pi^{1/2}(1-\mu_0^3)/3^{1/2}$$

$$k_{\mu l}=((2l+1)\pi)^{1/2}\left(\frac{(l-2)!(-1)^{(l-2)/2}}{2^l\left(\frac{l}{2}-1\right)!\left(\frac{l}{2}+1\right)!}+\sum_{k=l/2}^l\left(\frac{(2k)!(2k-(l-2)-1)(-1)^{l-k-1}}{2^l k!(l-k)!(2k-(l-2))!}\mu_0^{2k-(l-2)}\right)\right)$$

for $l\geq 2$, l even, and $$k_{\mu l}=((2l+1)\pi)^{1/2}\sum_{k=(l+1)/2}^l\frac{(2k)!(2k-(l-2)-1)(-1)^{l-k-1}}{2^l k!(2k-(l-2))!}\mu_0^{2k-(l-2)}$$

for $l\geq 3$, l odd. For $\mu_0=0$ the previous results are recovered. For $\mu_0>0$, there is no first-order (in $\mu_0$) change in $k_{\mu l}$. Second-order changes occur in $k_{\mu 0}$ and $k_{\mu l}$ for l even: $k_{\mu 2}$ increases as $-((5\pi)^{1/2}/4)\mu_0^2$ for $\mu_0$ small.

Table of $k_{\mu l}$

| L\$\mu_0$ | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0 | .886 | .887 | .851 | .806 | .744 | .665 | .567 | .452 | .319 | .168 | 0 |
| 1 | 1.023 | 1.022 | 1.015 | .996 | .958 | .895 | .802 | .672 | .499 | .277 | 0 |
| 2 | .495 | .505 | .532 | .572 | .615 | .650 | .659 | .624 | .520 | .322 | 0 |
| 3 | 0 | .002 | .018 | .058 | .126 | .220 | .324 | .410 | .432 | .325 | 0 |
| 4 | −.111 | −.120 | −.143 | −.163 | −.159 | −.109 | −.005 | .141 | .276 | .292 | 0 |
| 5 | 0 | −.004 | −.026 | −.102 | −.141 | −.189 | −.179 | −.076 | .103 | .233 | 0 |
| 6 | .050 | .051 | .074 | .069 | .020 | −.047 | −.165 | −.221 | −.043 | .159 | 0 |
| 7 | 0 | .005 | .032 | .078 | .108 | .073 | −.038 | −.153 | −.131 | .081 | 0 |
| 8 | −.029 | −.037 | −.044 | −.016 | .054 | .114 | .083 | −.055 | −.151 | .008 | 0 |
| 9 | 0 | −.006 | −.035 | −.066 | −.047 | .041 | .116 | .052 | −.111 | −.049 | 0 |
| 10 | .019 | .026 | .024 | −.019 | −.074 | −.054 | .057 | .109 | −.039 | −.086 | 0 |
| 11 | 0 | .007 | .035 | .044 | −.014 | −.082 | −.034 | .094 | .033 | −.101 | 0 |
| 12 | −.013 | −.019 | −.009 | .039 | .052 | −.028 | −.084 | .030 | .082 | −.095 | 0 |
| 13 | 0 | −.007 | −.031 | −.017 | .049 | .044 | −.064 | −.041 | .093 | −.073 | 0 |
| 14 | .010 | .015 | .033 | −.041 | −.018 | .058 | .002 | −.079 | .068 | −.049 | 0 |

In the foregoing, the $k_{\mu l}$ coefficients are shown for the harmonic expansion of the light reflected from a Lambertian surface in the presence of cast shadows in the crater approximation, where the elevation of the local horizon $\mu(\phi)=\cos(\theta(\phi))$ is taken to be independent of azimuth, $\mu(\phi)=\mu_0 \geq 0$. In a more general model, the full azimuthal dependence $\mu(\phi)$ is included, but the Lambertian factor is assumed to have the same form as in the crater model. While this restricts the actual dependence of the reflection on the surface normal, it provides an indication of the role played by higher harmonics.

Replacing $\mu_0$ with $\mu(\phi)$, the solution is straightforward to obtain from the crater result. Consider $k_{\mu l}$, and treat it as a functional of $\mu(\phi)$ rather than as a function of $\mu_0$. Thus $$k_{\mu l} = \int_0^{2\pi} d\phi \int_{\mu(\phi)}^1 d\mu \mu Y_{10}(\theta, \phi),$$

where $\mu=\cos \theta$. For $\mu(\phi)=\mu_0$, $k_{\mu l}$, is equal to $2\pi$ times a polynomial of degree (l+2) in $\mu_0$. For general $\mu(\phi)$, replace $\mu_0^n$ in the expression for $k_{\mu l}$ by $$\mu_0^n \rightarrow \int_0^{2\pi} d\phi \mu^n(\phi)/2\pi$$

If $l_L$ is the value of the index l of the largest harmonic of interest, we need only consider n such that $2 \leq n \leq (l_L+2)$:$l_L=1$ for the four-dimensional model (i.e. the $0^{th}$ and $1^{st}$ order spherical harmonic components); $l_L=2$ for the nine-dimensional model (i.e., the $0^{th}$, $1^{st}$ and $2^{nd}$ order spherical harmonic components). Note that the n=0 case is trivial, and that the n=1 case does not enter.

Even though the table given for $k_{\mu l}$ assumes $\mu(\phi)=\mu_0$, it is actually useful in the more general case. To see this let $$\overline{\mu^n} = \int_0^{2\pi} d\phi \mu^n(\phi)/2\pi$$

Then, since $\overline{\mu^n} \geq \overline{\mu}^n$ for $n \geq 1$ note that the actual values of $k_{\mu l}$ for $\mu(\phi)$ are indicative of the values given for $k_{\mu l}$ for $\mu(\phi)=\mu_0$, where $\overline{\mu} < \mu_0$. While admittedly rough, it is at once apparent that the dependence of $\mu$ on $\phi$ enhances the harmonic content of the image. Also, since $\overline{\mu} > \overline{\mu^2} > \overline{\mu^3}$... for most cases of interest, only relatively low values of n (powers of $\mu$) will play a significant role in the $k_{\mu l}$.

To include the full effect of cast shadows in the harmonic representation, one must fully express the expansion of the Lambertian factor. In both the crater model and the more general model an assumption was made to ignore the azimuthal dependence in the unit step function $\mu(\cdot)$, the $\phi$ dependence of $\mu(\phi)$. While satisfactory in those cases where $\mu(\phi)$ is nearly constant, in non-convex regions its variation with azimuth can be significant.

Though tricky to evaluate, the solution can be written down by analogy with the more general of the two cases evaluated above. If $r_{CS}(\hat{n})$ is the reflection in the presence of cast shadows due to a local horizon of $\mu(\phi)=\cos(\theta(\phi))$ that is due to an elevation dependent on azimuth $\phi$, then we can write much as above that $$r_{CS}(\hat{n})=u(\hat{z}\cdot\hat{n})\cdot d\hat{n}_i L(\hat{n}_i)(\hat{n}_i\cdot\hat{n})u(\hat{n}_i\cdot\hat{n}-\mu(\phi))$$

$$(\hat{n}_i \cdot \hat{n})u(\hat{n}_i \cdot \hat{n} - \mu(\phi)) = \sum_{lmm'} k_{lm}D^l_{m'm}(\hat{n})Y^*_{lm'}(\hat{n}_i)$$

$$k_{lm} = \int_0^{2\pi} d\phi \int_{\mu(\phi)}^1 d\mu \mu Y_{lm}(\theta, \phi), \mu = \cos\theta$$

Here $D_{m'm}^l(\alpha\beta\gamma)$ is the rotation matrix associated with spherical harmonics, and $(\beta,\alpha)$ are the polar coordinates of $\hat{n}(\gamma=0)$. Angles $(\alpha\beta\gamma)$ are the Euler angles of the effective rotation that takes the $\hat{z}$-axis from the viewing direction to the direction of the surface normal $\hat{n}$.

The evaluation of $k_{lm}$ is complicated by the azimuthal dependence of the elevation $\mu(\phi)$. One simplification that retains much of the azimuthal or phase coupling introduced by cast shadows is to assume that we can approximate $\mu(\phi)$ by two values, $\mu_1$ for $\phi_1 < \phi \leq \phi_2$ and $\mu_2$ for $\phi_2 < \phi \leq \phi_1+2\pi$. Then the integrals over $d\phi$ and $d\mu$ separate, and one obtains factors of $\sin(m(\phi_2-\phi_1)/2)/m$ entering the strength of the contribution to $k_{lm}$ from the $\mu(\phi)=\phi_1$ and $\mu(\phi)=\phi_2$ regions. Phases $m=p\pi/(\phi_2-\phi_1)$, p odd, yield the largest $k_{lm}$. Thus for m=0

$$k_{10} \approx (\phi_2 - \phi_1)\int_{\mu_1}^{\mu_2} d\mu\mu Y_{10}(\theta, \phi) + 2\pi \int_{\mu_2}^1 d\mu\mu Y_{10}(\theta, \phi),$$

and for m>0 or m<0

$$k_{lm} \approx e^{im\overline{\phi}}\sin(m\phi_{21}/2)/(m/2) \cdot \int_{\mu_1}^{\mu_2} d\mu \mu \overline{Y}_{lm}(\theta)$$

where $\overline{\phi}=(\phi_2+\phi_1)/2, \phi_{21}=(\phi_2-\phi_1), \overline{Y}_{lm}(\theta)=e^{-im\Phi}Y_{lm}(\theta,\phi)$, which is independent of $\phi$.

Another simplification arises when the local horizon is axially symmetric about an axis $\hat{m}$ other than the surface normal $\hat{n}$; we can call this the megaphone approximation and note its potential utility when only $\hat{n}$ and $\hat{m}$, but not the megaphone aperture $\mu_m$, vary with surface position. We write $$r_{CSM}(\hat{n}; \hat{m}, \mu_m)=\int d\hat{n}_i L(\hat{n}_i)(\hat{n}_i\cdot\hat{n}\vee 0)u(\hat{n}_i\cdot\hat{m}-\mu_m)$$

(the expression $A \vee B$ is equal to the greater of (A, B)) and express the three factors in the integrand as $$L(\hat{n}_i) = \sum_{lm} L_{lm}Y_{lm}(\hat{n}_i)$$

$$(\hat{n}_i \cdot \hat{n} \vee 0) = \sum_{l_1 m_1} k_{l_1} Y_{l_1 m_1}(\hat{n})Y^*_{l_1 m_1}(\hat{n}_i)$$

$$u(\hat{n}_i \cdot \hat{m} - \mu_m) = \sum_{l_2 m_2} p_{l_2} Y_{l_2 m_2}(\hat{m})Y^*_{l_2 m_2}(\hat{n}_i)$$

where $$k_l = \int_0^1 d\mu\mu Y_{l0}(\mu) \text{ and } p_l = \int_{\mu_m}^1 d\mu Y_{l0}(\mu).$$

By this point the analogy with diffuse-specular reflection should be clear. The term $P_l$ has replaced $k_l^{(P)}$, but otherwise the solution to that problem can be taken over intact. Thus one finds $$r_{CSM}(\hat{n}; \hat{m}, \mu_m) =$$

$$\sum_{lm} L_{lm} \sum_{l_1 m_1 l_2 m_2} I(l_1 l_2 l; m_1, m_2, m) k_{l_1} p_{l_2} Y_{l_1 m_1}(\hat{m}) Y_{l_2 m_2}(\hat{n})$$

where $$I(l_1 l_2 l; m_1, m_2, m) = \int d\hat{n}_i Y_{lm}(\hat{n}_i) Y^*_{l_1 m_1}(\hat{n}_i) Y^*_{l_1 m_2}(\hat{n}_i)$$

$$= ((2l_1 + 1)(2l_2 = 1)/$$

$$4\pi(2l + 1))^{1/2} C(l_1 l_2 l; m_1, m_2, m) C(l_1 l_2 l; 000)$$

where $C(l_1 l_2 l; m_1 m_2 m)$ are the Clebsch-Gordon(C-G) coefficients. When applicable, this approach is significantly more computable than the general solution above, increasing the speed of computation and/or maximizing the use of processing resources.

The foregoing expressions for the modification of the reflected intensity in the presence of cast shadows requires that the horizon $\mu(\phi)$ be determined for each surface position of interest. This requires two steps. First, the surface must be rotated so that the normal $\hat{n}$ at this position is parallel to the $\hat{z}$ axis. Then the maximum elevation $\mu(\phi)$ must be found in each direction of interest $\phi$. ($\mu(\phi)=\cos\theta(\phi)$ where $\theta(\phi)$ is the minimum polar angle from the vertical in the direction $\phi$.) The assumption is made that a set of surface positions $\{r\}=\{(r_x,r_y,r_z)\}$ is given in some known frame of reference.

The first task is to rotate each surface position r into r' such that the normal $\hat{n}$ at the position of interest $r_0$ becomes parallel to $\hat{z}$ at $r'_0$. This is accomplished by letting $r'=Rr$, where R is given by $$R = \hat{z}\hat{n}^T + (\hat{n}\times\hat{z})(\hat{n}\times\hat{z})^T + (\hat{z}\times(\hat{n}\times\hat{z}))(\hat{n}\times(\hat{n}\times\hat{z}))^T$$

Note especially that $R\hat{n}=\hat{z}$. The three terms in R operate on the component of r parallel to $\hat{n}$, to $\hat{n}\times\hat{z}$, and to $\hat{n}\times(\hat{n}\times\hat{z})$, respectively. With this preliminary step out of the way, one can determine the horizon $\mu(\phi)$ for position $r_0$.

It is now simplest to pass to a set of variables relative to $r'_0=Rr_0$:

$$r'-r'_0=(r'_x-r'_{0x}, r'_y-r'_{0y}, r'_z-r'_{0z})=(d_x,d_y,h)$$

$$d_x=(d_x^2+d_y^2)^{1/2}\cos\phi$$

$$d_y=(d_x^2+d_y^2)^{1/2}\sin\phi$$

The $(d_x,d_y)$ give the position of the height $h(d_x,d_y)$ of the surface above the plane through $r_0$ normal to $\hat{n}$. It follows that $\mu(\phi)$ is given by one of the following:

$\max(1+d_x^2/(h\cos\phi)^2)^{-1/2}$ $d_x$ $\max(1+d_y^2/(h\sin\phi)^2)^{-1/2}$ $d_y$ 0(zero)

where only $d_x$ or $d_y$ where $h(d_x, d_x\tan\phi)$ or $h(d_y\cot\phi, d_y)$, respectively exceed zero enter into the maximum. For $h \leq 0$ for all positions along $\phi$, $\mu=0$. Clearly, one will choose to use the first expression for $-\pi/4 \leq \phi \leq \pi/4$ and for $3\pi/4 \leq \phi \leq 5\pi/4$, and the second for $\pi/4 \leq \phi \leq 3\pi/4$ and for $5\pi/4 \leq \phi \leq 7\pi/4$.

As an example, see the following illustration computing $\mu(\phi)$ for a ridge of isosceles-triangular cross section of height $h>0$ and base b, and unspecified length —somewhat like the nose on a face. At a distance $d>b/2$ to the left of the centerline of the base of the ridge, taken in the direction $\phi=\pm\pi/2, \mu(\phi)=(1+(d/h\cos\phi)^2)^{-1/2}$ for $-\pi/2 \leq \phi \leq \pi/2$ and $\mu(\phi)=0$ for $\pi/2 \leq \phi \leq 3\pi/2$. On the left side of the ridge itself $\mu(\phi)=(1+(b/2h)^2)^{-1/2}$ for $\pi/2 \leq \phi \leq 3\pi/2$ and $\mu(\phi)=0$ for $-\pi/2 \leq \phi \leq \pi/2$. The latter is an example of $\mu(\phi)$ constant over ranges of $\phi$, whose solution was given above. The former can be approximated over appropriate ranges of $\phi$, or integrated over $\phi$ if greater precision is required. Very similar solutions apply for a trapezoidal ridge, with $\mu(\phi)=0$ along the top of the ridge.

The crater model is sufficiently simple to introduce most of the effects due to cast shadows. Odd orders (l=3,5,7, . . .), which play no role in the case of convex, Lambertian surfaces, become appreciable as the crater deepens. The strength of orders $l \geq 4$ oscilate in value as the fit for the various modes waxes and wanes with increasing $\mu_0$. From the general solution, note the couplings between the azimuthal frequencies in the horizons and those in the resulting expansions. The actual calculation of the horizon was indicated only briefly, as it has probably been more fully developed in the graphics community.

The rotation matrices used in the method are discussed by Rose, M. E., *Elementary Theory of Angular Momentum*. They enable the spherical harmonics in a rotated coordinate system to be expressed in terms of those in the reference system. Thus, $$D^l_{m'm}(\alpha\beta\gamma) = \sum_t \frac{(-1)^t((l+m)!(l-m)!(l+m')!(l-m')!)^{1/2}}{t!(l-t-m')!(l+m-t)!(m'+t-m)!} \cdot e^{-im'\alpha}$$

$$e^{-im\gamma}(\cos(\beta/2))^{2l+m-m'-2t}(-\sin(\beta/2))^{m'-m+2t}$$

In the summation over t, t is such that the four factorials in the denominator are well-defined. Thus each of $t \geq 0$, $l-m' \geq t$, $l+m \geq t$, $t \geq m-m'$, must be satisfied for each possible t. Also, $l \geq |m|$ and $l \geq |m'|$.

Clearly $D^0_{00}(\alpha\beta\gamma)=1$.

Tables for l=1 are commonplace:

|  | m = 1 | m = 0 | m = −1 |
| --- | --- | --- | --- |
| m' = 1 | $e^{-i\alpha}Ce^{-i\gamma}$ | $-e^{-i\alpha}2^{-1/2}s$ | $e^{-i\alpha}Se^{i\gamma}$ |
| m' = 0 | $2^{-1/2}se^{-i\gamma}$ | c | $-2^{-1/2}se^{i\gamma}$ |
| m' = −1 | $e^{i\alpha}Se^{-i\gamma}$ | $e^{i\alpha}2^{-1/2}s$ | $e^{i\alpha}Ce^{i\gamma}$ | where $C=(1+\cos\beta)/2$, $S=(1-\sin\beta)/2$, $c=\cos\beta$, $s=\sin\beta$. Values for l=2 are also needed, which have been worked out in the following table. The $e^{-im'\alpha}$ and $e^{-im\gamma}$ factors are omitted the clarity of the table although, of course, these must be included in any solution.

|     | m = 2 | m = 1 | m = 0 | m = −1 | m = −2 |
| --- | --- | --- | --- | --- | --- |
| m' = 2 | $C^2$ | −Cs | $(3/8)^{1/2}s^2$ | −Ss | $S^2$ |
| m' = 1 | Cs | C(2c − 1) | $-(3/2)^{1/2}sc$ | S(2c + 1) | −Ss |
| m' = 0 | $(3/8)^{1/2}s^2$ | $(3/2)^{1/2}sc$ | $(3c^2 − 1)/2$ | $-(3/2)^{1/2}sc$ | $(3/8)^{1/2}s^2$ |
| m' = −1 | Ss | S(2c + 1) | $(3/2)^{1/2}sc$ | C(2c − 1) | −Cs |
| m' = −2 | $S^2$ | Ss | $(3/8)^{1/2}s^2$ | Cs | $C^2$ |

Further, a number of indefinite integrals enter in connection with the integration over the elevation ($\mu=\cos\theta$) of the spherical harmonics. The following table should be self-explanatory:

|  | $\int Y_{lm}(\mu)d\mu$ | $\int \mu Y_{lm}(\mu)d\mu$ |
| --- | --- | --- |
| $Y_{00} \sim 1$ | $\mu$ | $\mu^2/2$ |
| $Y_{10} \sim \mu$ | $\mu^2/2$ | $\mu^3/3$ |
| $Y_{1\pm 1} \sim (1-\mu^2)^{1/2}$ | $(\mu(1-\mu^2)^{1/2} - \cos^{-1}\mu)/2$ | $-(1-\mu^2)^{3/2}/3$ |
| $Y_{20} \sim (3\mu^2 - 1)$ | $-\mu(1-\mu^2)$ | $\mu^2(3\mu^2/2 - 1)/2$ |
| $Y_{2\pm 1} \sim \mu(1-\mu^2)^{1/2}$ | $-(1-\mu^2)^{3/2}/3$ | $((1-\mu^2)^{1/2}\mu(2\mu^2-1) - \cos^{-1}\mu)/8$ |
| $Y_{2\pm 2} \sim (1-\mu^2)$ | $\mu(1-\mu^2)/3$ | $\mu^2(1-\mu^2/2)/2$ |

Application of the Reflectance Function

The method of deriving the reflectance function described above is used in the object recognition process. To match an input image with an object model in a database, the object model must first be positioned to match the position of the input image. There are standard methods of performing this function known in the art, though a preferred method is disclosed in U.S. patent application Ser. No. 09/538,204, filed 30 Mar. 2000, entitled "Method for Matching a Two Dimensional Image to One of a Plurality of Three Dimensional Candidate Models in a Database", the disclosure of which is hereby incorporated by reference.

Once positioned, images of the model are rendered under each of one or more spherical harmonic components of light, based upon the reflectance function described above. These component rendered images can be linearly combined to arrive at an optimal rendered image of the model. An optimal rendered image means a rendered image that most closely approximates the input image. The comparison of the various rendered images to the input image is made by calculating the Euclidian Distance between the images, in a manner that is known in the art. The optimization is performed by a least squares fit technique between the vector that is the reflectance function and the matrix that represents the input image, also known in the art.

Other steps follow the optimization in the recognition process. One is computing some measure of similarity between the input image and the optimal rendered image for each model. This is accomplished by measuring the Euclidian Distance between each optimal image and the input image. The object model whose optimal rendered image is nearest the input image, assuming some threshold value of similarity must be reached, is a match to the input image.

While the reflectance function of the present invention is described in application to the field of machine vision, it is not limited to that field. There are numerous parallels between this work and advances in the field of computer graphics, and our invention has applicability there as well. The field of computer graphics is continually striving to produce more realistic rendered images based on object models that exist only in the computer. The reflectance function of the present invention advances that work as well.

The invention has been described herein with reference to a particular exemplary embodiment. Certain alterations and modifications may be apparent to those skilled in the art, without departing from the scope of the invention. The exemplary embodiment is not meant to be limiting on the scope of the invention, which is defined by the appended claims.

To be secured by United States Letters Patent, what is claimed is:

1. A method of recognizing objects under various lighting conditions comprising the steps of:
   (a) providing a database comprising a plurality of three dimensional models;
   (b) providing an input image;
   (c) positioning each three dimensional model relative to the input image;
   (d) determining, for each three dimensional model, an optimal rendered image which is most similar to the input image, said determining step comprising:
      (i) deriving a reflectance function that describes an approximation of the set of all possible rendered images that each three dimensional model can produce under all possible lighting conditions, wherein said reflectance function analytically excludes illumination within cast shadows on said model; and
      (ii) optimizing the reflectance function to determine an optimal rendered image of each model that is most similar to the input image;
   (e) computing a measure of similarity between the input image and each optimal rendered image; and
   (f) selecting the three dimensional model corresponding to the optimal rendered image whose measure of similarity is most similar to the input image.

2. The method according to claim 1 wherein the reflectance function includes a local horizon for each point on each said model, wherein no light originating below said local horizon contributes to the reflectance from said point.

3. The method according to claim 2 wherein said local horizon is defined by the polar angle of said local horizon in any direction.

4. The method according to claim 2 wherein said local horizon is variable with the azimuth at each point on said model.

5. A method of image recognition of an input image, the method comprising:
   (a) receiving a three-dimensional model of a candidate object in a particular orientation;
   (b) generating a set of harmonic images for the three-dimensional model, the harmonic images forming the basis for a linear subspace, and approximating the reflectance on the candidate object when illuminated by a harmonic light, said reflectance analytically excludes illumination within cast shadows on said three-dimensional model; and
   (c) selecting a candidate image from the set of harmonic images, the candidate image representing a point in the linear subspace that is nearest to the input image, by seeking a vector of harmonic coefficients that minimizes the difference between the input image and the candidate image.

6. The method according to claim 5, wherein the candidate image is restricted to a subset of harmonic images that corresponds to physically realizable lighting conditions.

7. The method according to claim 5, wherein the linear subspace comprises the first four harmonic images.

8. The method according to claim 5, wherein the linear subspace comprises the first nine harmonic images.

9. The method according to claim 5, wherein the linear subspace comprises the first eighteen harmonic images.

10. The method according to claim 5, wherein the harmonic light comprises spherical harmonic light.

11. The method according to claim 5, wherein analytically excluding illumination within cast shadows on said three-dimensional model comprises excluding those components of a harmonic light originating below a local horizon at each point of the three-dimensional model.

12. The method according to claim 11 wherein the local horizon is presumed to be constant around a line of azimuth.

13. The method according to claim 12, wherein the line of azimuth is collinear with a local surface normal.

14. The method according to claim 12, wherein the line of azimuth forms an angle with a local surface normal.

15. The method according to claim 12, wherein approximating the reflectance on the candidate object when illuminated by a harmonic light further comprises approximating a general solution for some subset of points on the surface of the three-dimensional model that are within a common mutual horizon.

* * * * *